United States Patent
Zhang et al.

(10) Patent No.: US 10,153,714 B2
(45) Date of Patent: Dec. 11, 2018

(54) ADAPTIVE PULSE WIDTH MODULATION IN MOTOR CONTROL SYSTEMS

(71) Applicant: STEERING SOLUTIONS IP HOLDING CORPORATION, Saginaw, MI (US)

(72) Inventors: Zhe Zhang, Saginaw, MI (US); Prerit Pramod, Saginaw, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 0 days.

(21) Appl. No.: 15/362,895

(22) Filed: Nov. 29, 2016

(65) Prior Publication Data

US 2018/0152123 A1    May 31, 2018

(51) Int. Cl.
| H02M 7/527 | (2006.01) |
| H02P 6/08 | (2016.01) |
| B62D 5/04 | (2006.01) |

(52) U.S. Cl.
CPC .............. H02P 6/08 (2013.01); B62D 5/0463 (2013.01)

(58) Field of Classification Search
CPC ....... H02M 7/527; H02M 7/5395; H02P 7/29; H02P 27/08
See application file for complete search history.

(56) References Cited

U.S. PATENT DOCUMENTS

| 5,706,186 A | 1/1998 | Blasko | |
| 6,023,417 A * | 2/2000 | Hava | H02M 7/53875 |
| | | | 318/811 |
| 2011/0187304 A1* | 8/2011 | Anwar | G01R 31/343 |
| | | | 318/490 |
| 2013/0066501 A1* | 3/2013 | Oyama | B60L 3/003 |
| | | | 701/22 |
| 2015/0280619 A1 | 10/2015 | Marohl et al. | |
| 2016/0322890 A1* | 11/2016 | Lee | H02M 1/12 |

OTHER PUBLICATIONS

Julian Felix Wolfe, A hybrid discontinuous modulation technique to influence the switching losses of three phase inverters, IEEE, Oct. 29, 2015.*
English Translation of German Office Action for Application No. 102017127780.3 dated Jun. 18, 2018, 7 pgs.
Hak-Jun Lee et al., "A Carrier-based Adjustable Discontinuous PWM for Three-Phase Voltage Source Inverter", Energy Conversion Congress and Exposition (ECCE), 2017, pp. 2870-2875, IEEE [online].

* cited by examiner

*Primary Examiner* — Bickey Dhakal
(74) *Attorney, Agent, or Firm* — Cantor Colburn LLP (57) ABSTRACT

An embodiment of a control system for controlling operation of an electric motor includes a current command module configured to receive a torque command and output a current command, and a current controller module configured to generate a modulation index value based on the current command. The system also includes a signal generator configured to generate a voltage signal modulated via a pulse width modulation (PWM) scheme based on the modulation index value, the PWM scheme being a combination of a continuous PWM scheme and a non-continuous PWM scheme based on the modulation index value being greater than or equal to a first threshold value, the signal generator configured to output the voltage signal to the electric motor.

18 Claims, 5 Drawing Sheets

ADAPTIVE PULSE WIDTH MODULATION IN MOTOR CONTROL SYSTEMS

BACKGROUND OF THE INVENTION

The present invention relates to methods and systems for controlling electric motors, and more particularly to methods and systems for generating modulation signals used for control of an electric motor.

A controller typically controls an electric motor by generating duty cycle signals for each motor phase, e.g., using pulse width modulation (PWM) techniques, which are used to provide phase voltage signals to the motor. For example, electric motors are generally controlled by a feedback system including a current regulator and a modulator that uses a sinusoidal PWM scheme to generate and transmit gate drive signals to a three-phase inverter (DC-AC converter). The inverter supplies voltage signals for each phase of an electric motor. The voltages produced by the inverter are heavily dependent on the inverter control scheme used, and sub-optimal techniques can result in undesirable torque ripple and audible noise in high performance applications such as electric power steering (EPS).

A current control mechanism is typically employed for controlling the electric motor, which may include a current regulator (which can have several different designs) operating on measured current feedback, but is not so limited. Other current control mechanisms may include feedforward current controllers that use a static or dynamic inverse machine model (or plant model in general, depending on the system being controlled). Such feedforward current control systems do not require measured current feedback.

SUMMARY OF THE INVENTION

An embodiment of a control system for controlling operation of an electric motor includes a current command module configured to receive a torque command and output a current command, and a current controller module configured to generate a modulation index value based on the current command. The system also includes a signal generator configured to generate a voltage signal modulated via a pulse width modulation (PWM) scheme based on the modulation index value, the PWM scheme being a combination of a continuous PWM scheme and a non-continuous PWM scheme based on the modulation index value being greater than or equal to a first threshold value, the signal generator configured to output the voltage signal to the electric motor.

An embodiment of a method of controlling an electric motor includes receiving a torque command and outputting a current command by a current command module, and generating a modulation index value based on the current command. The method also includes generating a voltage signal by a signal generator, the voltage signal modulated via a pulse width modulation (PWM) scheme based on a modulation index value, the PWM scheme being a combination of a continuous PWM scheme and a non-continuous PWM scheme based on the modulation index value being greater than or equal to a first threshold value; and outputting the voltage signal to the electric motor.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
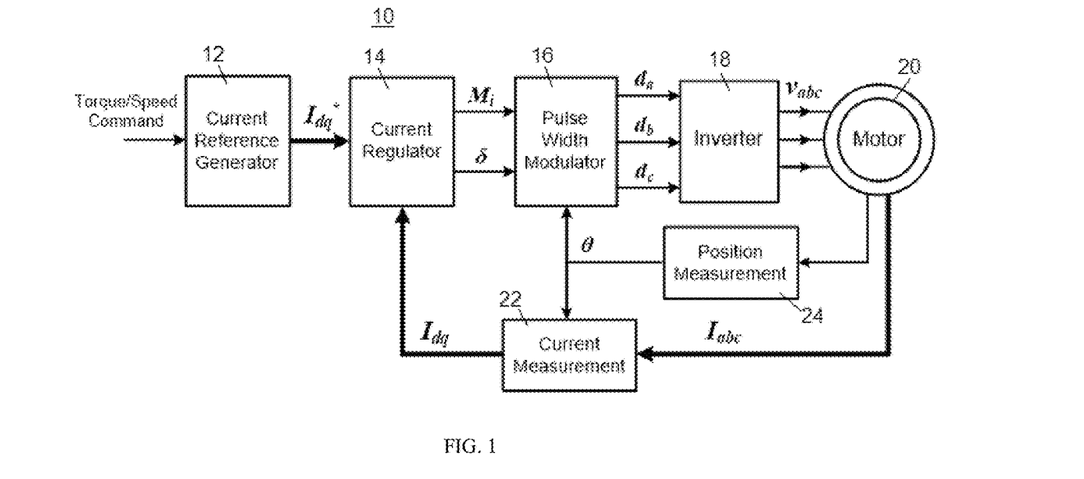
FIG. 1 is a schematic illustrating components, modules and functions of a motor control system in accordance with an embodiment of the invention.

Referring now to FIG. 1, a dataflow diagram illustrates an exemplary embodiment of a control device or system 10 for controlling an electric motor such as an alternating current (AC) motor. The electric motor and control devices and systems described herein can be used for any suitable purpose. For example, the electric motor and the control system 10 can be part of a steering system such as an electrical power steering (EPS), driver assistance system and/or vehicle control system (e.g., autonomous or semi-autonomous steering system). It is noted that the embodiments described herein may be employed in conjunction with any device or system that utilizes an electric motor or motors.

In various embodiments, the control device or system (e.g., the module 40) can include one or more sub-modules and data-stores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality.

In the example of FIG. 1, the control system 10 includes various modules or sub-modules such as a current reference generator module 12 that receives a torque or speed command and outputs a current command $I_{dq}^*$ to a current controller 14 (such as a current regulator acting on measured current feedback), which in turn outputs modulation parameters such as modulation index ($M_i$) and phase advance ($\delta$) to a pulse width modulator 16 (also referred to as a duty cycle generator). The current command is in a synchronously rotating reference frame, commonly referred to as the d/q (direct-quadrature) axis reference frame, and the current command $I_{dq}^*$ includes a direct component $I_d^*$ and a quadrature component $I_q^*$. The pulse width modulator 16 outputs multiphase duty cycle (or gate drive) signals $d_a$, $d_b$ and $d_c$ for the a, b and c phase respectively to an inverter 18, which generates three phase motor voltage commands for each phase of a three-phase motor 20. The pulse width modulator 16 and the inverter 18 (or portions thereof) may be collectively referred to as a signal generator.

The control system includes various measurement feedback functions and/or modules that measure properties of the motor 20 and return such properties to the control system 10 to be used in adjusting control parameters. The control system 10 can be characterized as a closed loop current feedback control system.

In one embodiment, feedback measurements include a current measurement module 22 and a position measurement module 24 that supply motor current and position information used for commutation of the electric motor. The current measurement module 22 measures three-phase motor currents $I_a$, $I_b$ and $I_c$ (referred to collectively as $I_{abc}$), converts the currents into the d/q reference frame and outputs measured currents $I_d$ and $I_q$ ($I_{dq}$) in the d/q reference frame. In a d/q axis reference frame, the motor voltages and currents become direct current (DC) quantities.

Motor position measurements indicate the angular or rotational position of the motor 20. In one embodiment, the feedback loop includes the position measurement module 24 that measures motor position θ, and outputs the motor position to the pulse width modulator 16 and/or the current measurement module 22.

A processing device or system, such as the control system 10 and/or components (e.g., processing modules) thereof, is configured to control an electric motor according to a control method that includes applying a voltage signal to a motor according to an adaptive pulse width modulation (APWM) scheme or method. The processing device, which in one embodiment is a signal generator including at least a portion of the pulse width modulator 16 and the inverter 18, receives current signals including a modulation index ($M_i$) signal, and generates a voltage signal that is modulated according to the APWM method. The APWM method includes applying a combination of a continuous PWM scheme and a non-continuous PWM scheme depending on the value of the $M_i$ signal. The processing device compares the $M_i$ value to a selected threshold value, and applies the combination based on the $M_i$ value being greater than or equal to the selected threshold value.

In one embodiment, the APWM method includes generating the voltage signal using a continuous PWM scheme if the $M_i$ value is less than the threshold, and using the combination if the $M_i$ value is greater than or equal to the threshold and less than a second value that is greater than the threshold. In this way, a $M_i$ value range is selected so that the combination is applied only if the $M_i$ value is within the range. If the $M_i$ value is greater than the second value, a non-continuous PWM is used.

Embodiments described herein improve motor control systems, including feedback control systems for torque, speed or position control of electric motors. As voltages produced by inverters are heavily dependent on the inverter control scheme used, sub-optimal inverter control techniques can result in undesirable torque ripple and audible noise in high performance applications such as EPS. The embodiments described herein ensure that modulation techniques can be automatically adjusted for different conditions and thereby avoid such undesirable outcomes.

In one embodiment, the APWM scheme incorporates a variety of continuous and non-continuous PWM schemes for controlling switching signals and voltages applied to an electric motor. Examples of continuous PWM schemes include sinusoidal PWM (SPWM) and space vector PWM (SVPWM).

SPWM involves generating a sinusoidal waveform that is used directly as the modulation signal for a given modulation index $M_i$ and direct current (DC) bus voltage $V_{DC}$. The voltage generated via SPWM can be mathematically expressed as:

$$V_{SPWM} = \left(\frac{1}{2} + \frac{1}{2}\sin\omega t M_i\right)V_{DC}$$

where t is time and ω is the angular electrical velocity of the electric motor. The SPWM method is simple to implement but may not fully utilize the DC bus capability.

SVPWM improves DC bus utilization by injecting third and higher odd order harmonics into the fundamental waveform. The generated voltage with SVPWM can be expressed as:

$$V_{SVPWM} = \left(\frac{1}{2} + \frac{1}{\sqrt{3}}\left(\sin\omega t + \frac{1}{2}f(\omega t)\right)M_i\right)V_{DC}$$

Figure 2:
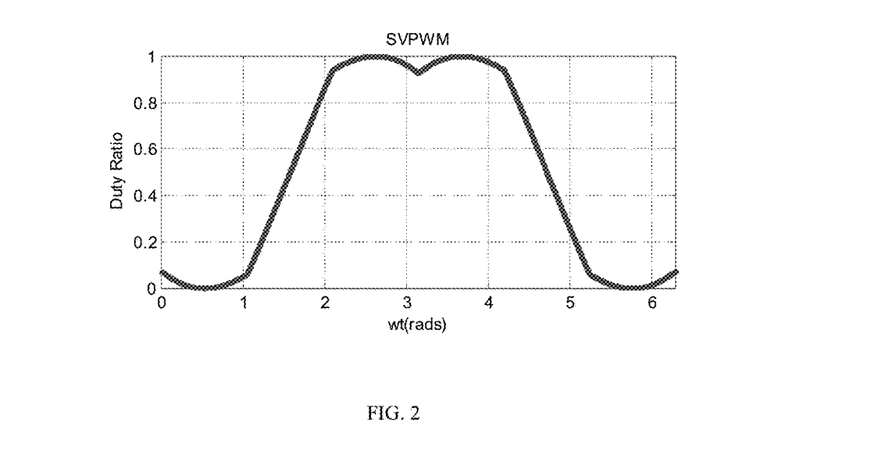
FIG. 2 depicts an example of a duty cycle waveform generated according to a continuous pulse width modulation (PWM) scheme.

In the above equation, $f(\omega t)$ is a function representing a higher odd order harmonic. In this example, the above expression for $V_{SVPWM}$ shows that the magnitude of the fundamental sine wave is 0.577, which is approximately 15.5% higher than that of SPWM. This means that a DC-AC power converter using SVPWM can output a 15.5% higher line-to-line voltage than that using SPWM, assuming the DC bus voltage remains the same. An example of a duty ratio waveform for SVPWM is shown in FIG. 2.

Examples of non-continuous PWM schemes include discontinuous PWM minimum (DPWMMIN), discontinuous PWM minimum with offset (DPWMMINO) and others. The mathematical expression for voltage of the DPWMMIN can be expressed as:

$$V_{DPWMMIN} = \left(\frac{1}{2} + \frac{1}{\sqrt{3}}(\sin\omega t - (1 + \min(V_{PGA}, V_{PGB}, V_{PGC})))M_i\right)V_{DC}$$

Figure 3:
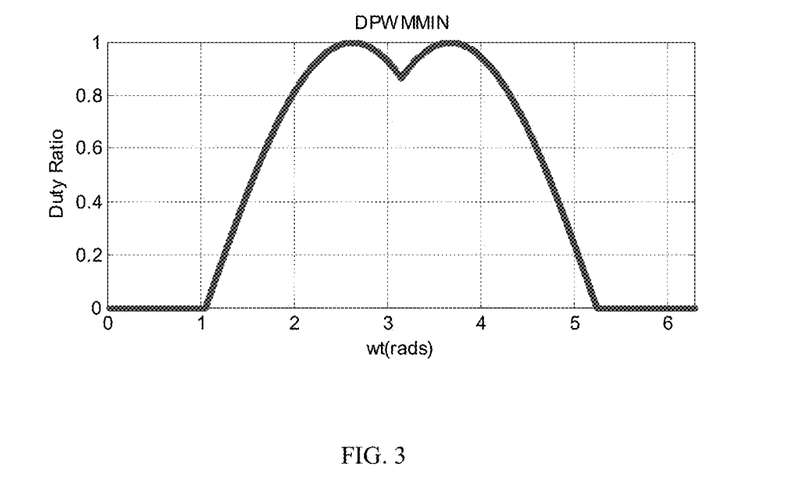
FIG. 3 depicts an example of a duty signal waveform generated according to a non-continuous pulse width modulation (PWM) scheme.

In the above equation, $V_{PGA}$, $V_{PGB}$ and $V_{PGC}$ are phase voltages (for phase a, b, and c respectively) for a given control cycle, and "$\min(V_{PGA}, V_{PGB}$ and $V_{PGC}$" is the minimum phase voltage of each phase for the control cycle. In this example, similar to SVPWM, the above expression for $V_{DPWMMIN}$ shows that the maximum magnitude of the fundamental sine wave that can be generated with DPWM-MIN is $0.577 \cdot V_{DC}$. An example of a duty ratio waveform of the DPWMMIN scheme is shown in FIG. 3.

DPWMMINO was developed based on DPWMMIN to fix the inverter switching nonlinearity problem when the modulation index is low. A constant value is added to DPWMMIN to warm up the switches at low modulation index.

Non-continuous PWM schemes provide advantages such as reduced switching losses and higher resolution. For example, the DPWMMIN scheme has one third of the period clamping the inverter leg to ground. Therefore, the switching losses with DPWMMIN can be reduced since no switch is activated in the clamped region. Furthermore, the maximum value of DPWMMIN is proportional to modulation index so that the entire duty ratio range from 0 to 100% can be used, which leads to a higher PWM resolution. However, the DPWMMINO scheme is preferred over the DPWMMIN since it overcomes the inverter nonlinearity at low modulation indices, at the cost of increased switching losses.

However, such non-continuous schemes present some disadvantages which are overcome by continuous PWM schemes. For example, non-continuous schemes can produce higher harmonic that can result in higher distortions. For example, a comparison of the harmonic contents of SVPWM and DPWMMIN schemes shows that, unlike DPWMMIN (and DPWMMINO), SVPWM does not contain 6n (n=0, 1, 2 . . . ) order harmonics. Theoretically, the total harmonic distortion (THD) of DPWMMIN is approximate 4.87% higher than that of SVPWM.

The APWM scheme combines the benefits of SVPWM and DPWMMIN simultaneously, i.e., the lower harmonics and losses. The APWM reduces the audible noise in the low modulation index operating region, especially when low switching frequencies are used. Also, the computational complexity of the APWM scheme is low, for example, when a lookup table based method can be utilized.

A three-phase two-level inverter can generate a total of eight voltage vectors; six of them are active vectors and two are zero vectors. To make the motor flux vector trajectory circular, synthesis of multiple voltage vectors (including active and zero vectors) is performed. For SVPWM, four voltage vectors $V_{act1}$, $V_{act2}$, $V_0$ and $V_7$ are executed in one switching cycle (i.e., control cycle). The on-time allocations among the four vectors are determined by the voltage command and DC bus voltage. It has been found that DPWMMIN uses three vectors $V_{act1}$, $V_{act2}$ and $V_0$, to synthesize the desired voltage vector and the durations of $V_{act1}$ and $V_{act2}$ can be the same as those in SVPWM. This is helpful in understanding the correlation between the SVPWM and DPWMMIN, and more importantly, simplifies the duty ratio calculations for SVPWM. Assuming that the instantaneous duty ratios of DPWMMIN for the three phases are known (e.g., obtained from a look-up table), the duty ratios for SVPWM can be written as:

$$V_{SVPWM} = V_{DPWMMIN} + \frac{1}{2}(1 - \max(V_{DPWMMIN}))$$

where "$\max(V_{DPWMMIN})$" is the maximum voltage calculated for a given control cycle using DPWMMIN.

In one embodiment of the APWM scheme or method, the constant "½" in the above equation is replaced by a blending function $f_b(M_i)$ that generates a value dependent on the modulation index. The value can be calculated using any suitable function, mathematical equation, curve or set of values (e.g., from a look up table or other relational data structure). The function may replace the constant or otherwise provide a relationship with modulation index for a selected range of modulation index values bounded by a lower value $a_1$ and an upper value $a_2$. $a_1$ is selected so that the APWM scheme is exclusively a continuous scheme for lower modulation index values more suitable to continuous PWM schemes, and the APWM scheme is exclusively a non-continuous scheme for higher modulation index values more suitable to non-continuous PWM schemes. An example of a suitable range is defined by selecting $a_1$ to be equal to approximately 0.6 and selecting $a_2$ to be equal to approximately 0.9.

In one embodiment, the mathematical expression of the APWM has the following form:

$$V_{APWM} = V_{DPWMMIN} + f_b(M_i)(1 - \max(V_{DPWMMIN}))$$

In one embodiment, the function $f_b(M_i)$ is a piecewise function that is equal to a constant when the modulation index is outside of the range defined by $a_1$ and $a_2$, and is inversely proportional to $M_i$ when the modulation index is within the range. For example, the function $f_b(M_i)$ is a piecewise linear function that provides a smooth transition from SVPWM to DPWMMIN with only a few additional computations. An example of this function is as follows:

$$f_b(M_i) = \begin{cases} \frac{1}{2}, & 0 \le M_i < a_1 \\ \frac{1}{2}\left(\frac{a_2 - M_i}{a_2 - a_1}\right), & a_1 \le M_i < a_2 \\ 0, & a_2 \le M_i < 1 \end{cases}$$

It is noted that, although the expression for the APWM scheme is discussed with reference to DPWMMIN, it is not so limited. The APWM scheme can be used to blend any suitable continuous scheme (e.g., SPWM or SVPWM) with any suitable non-continuous scheme (e.g., DPWMMIN or DPWMMINO).

Figure 4:
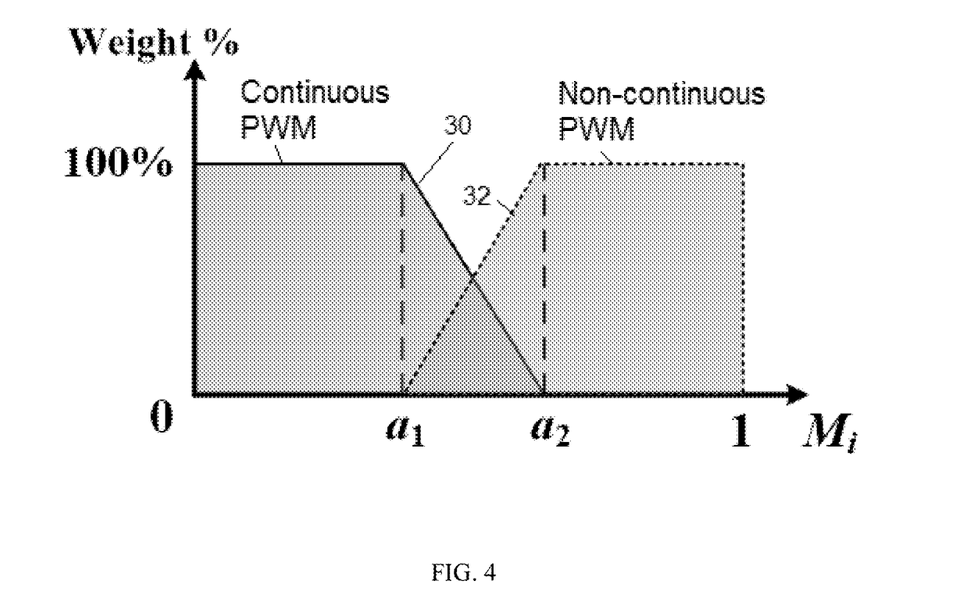
FIG. 4 is a graph illustrating an example of a blending function for combining a continuous and non-continuous PWM scheme according to an embodiment of the invention.

The aforementioned function implementing a blending operation is illustrated in FIG. 4. Curve 30 represents the percentage or weight given to a continuous PWM scheme as a function of modulation index $M_i$, curve 32 represents the percentage or weight given to a non-continuous PWM scheme. As shown, the modulation index is within a relatively low value range, the SVPWM waveform dominates. This low value range is shown as being between zero and $a_1$. In an intermediate value range, between $a_1$ and a larger $M_i$ value $a_2$, the SVPWM waveform is blended with the DPWMMIN waveform so that as the $M_i$ increases, the relative weight of the DPWMMIN increases until the DPWMMIN waveform dominates at values greater than or equal to $a_2$.

Figure 5:
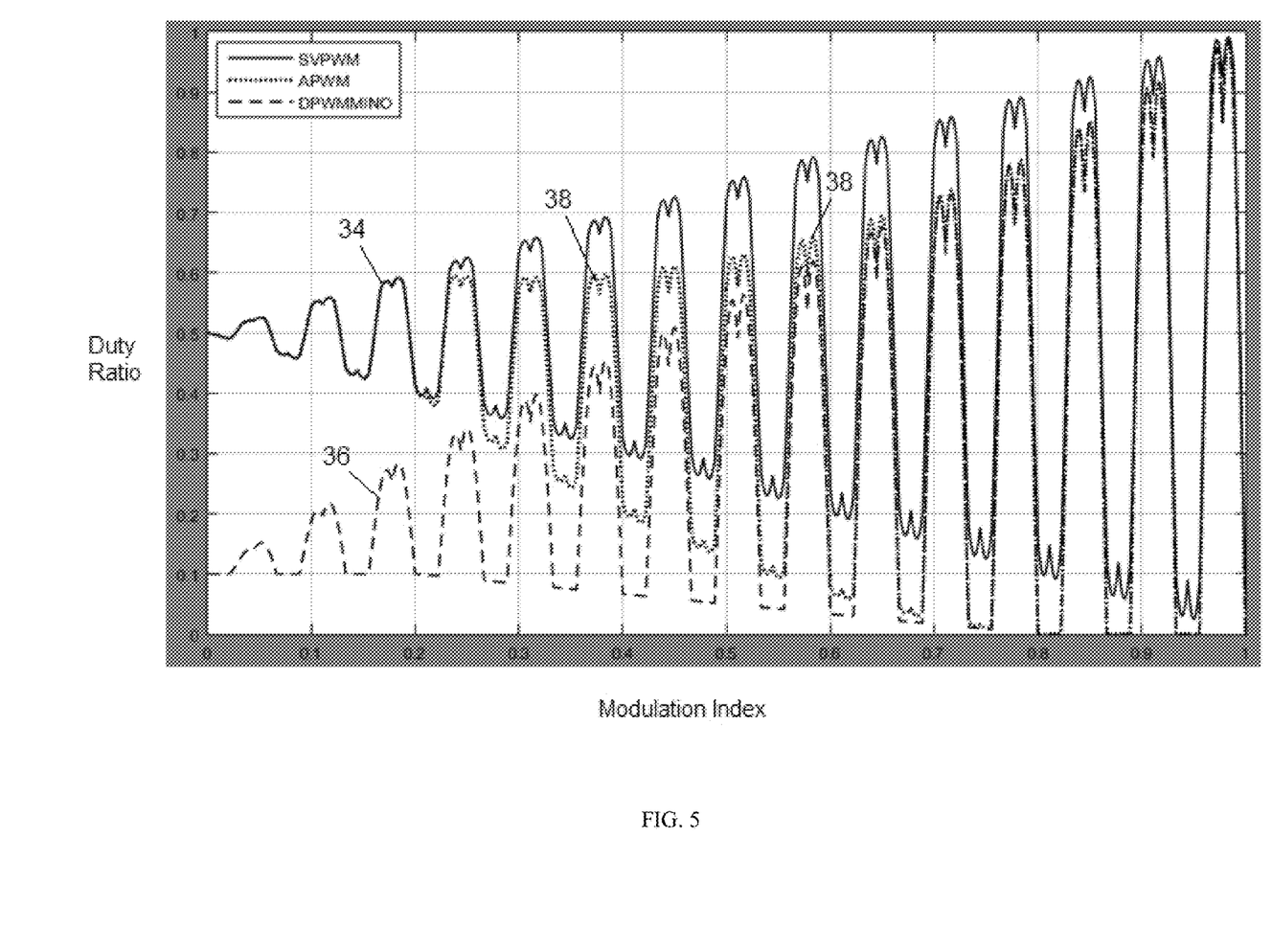
FIG. 5 is a graph of duty cycle waveforms generated based on an embodiment of an adaptive pulse width modulation (PWM) scheme as compared with other PWM schemes.

FIG. 5 shows an example of a comparison of a duty ratio waveform of the APWM scheme described above with conventional PWM scheme waveforms as the modulation index increases. Curve 34 is a waveform generated using the SVPWM scheme, curve 36 is a waveform generated using the DPWMMINO scheme, and curve 38 is a waveform generated using the APWM scheme. As shown, the APWM scheme is continuous at low $M_i$ values up to about 0.2 (e.g., is the same as the SVPWM scheme) and gradually transitions from a continuous to a non-continuous scheme as $M_i$ values increase to about 0.8, after which the APWM scheme is non-continuous (e.g., is the same as the DPWMMIN and/or DPWMMINO scheme).

Figure 6:
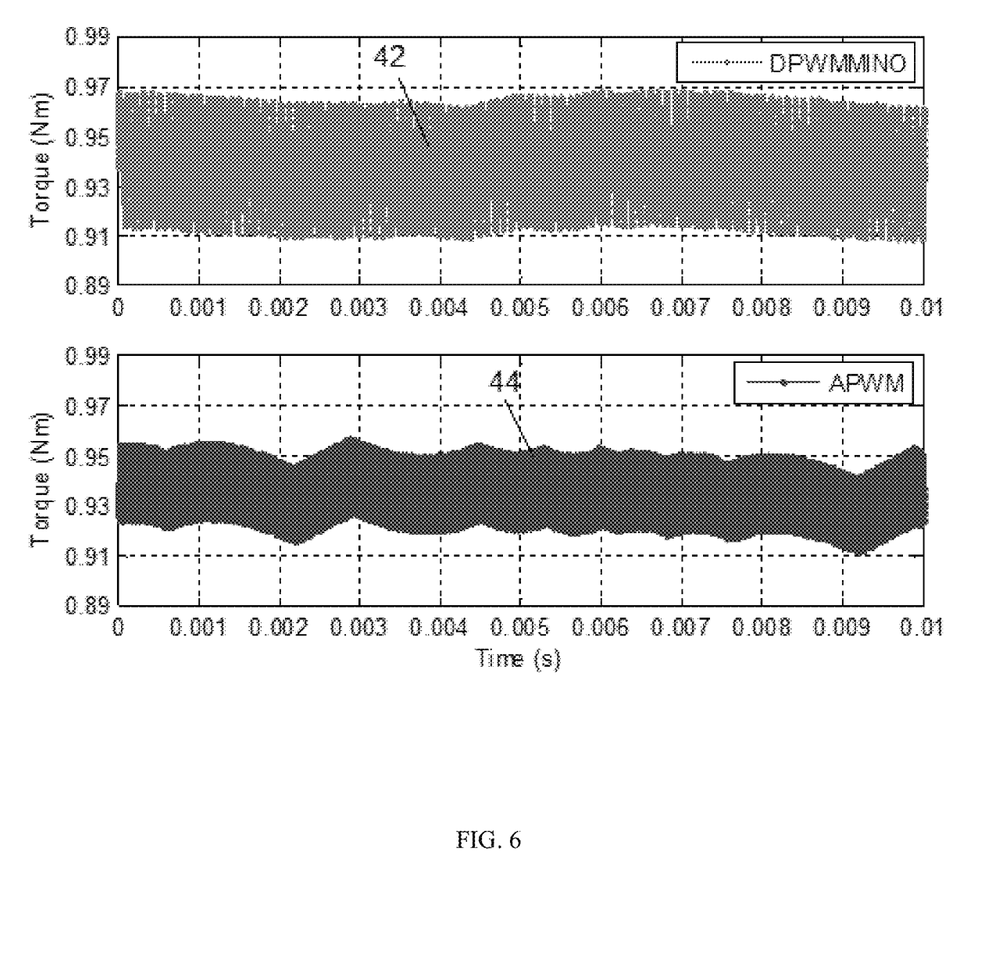
FIG. 6 depicts a simulation of torque generated by an electric motor based on an adaptive PWM scheme according to an embodiment of the invention.
Figure 7:
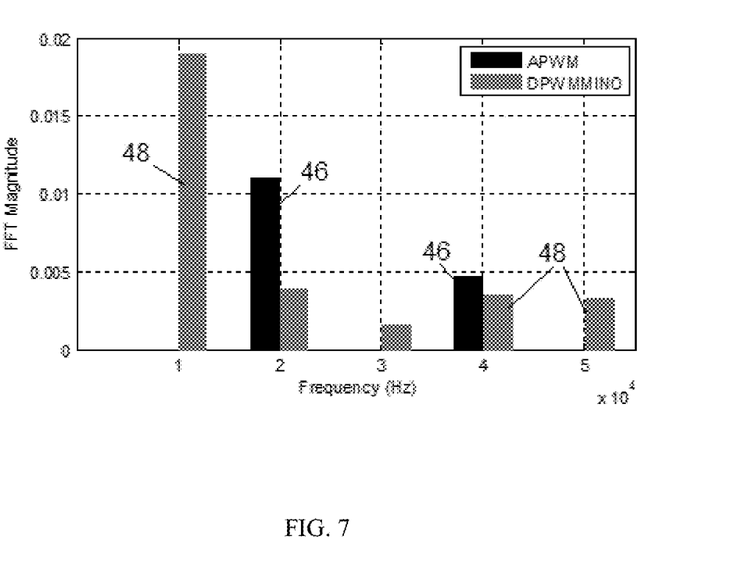
FIG. 7 depicts a torque frequency spectrum generated by an electric motor based on an adaptive PWM scheme according to an embodiment of the invention.

FIGS. 6 and 7 depict examples of comparisons between the APWM scheme and a conventional non-continuous PWM scheme. FIG. 6 shows simulation results comparing the electromagnetic torque response 42 of a motor using the DPWMMINO scheme, and the electromagnetic torque response 44 using the APWM scheme within 0.01 s. FIG. 7 shows simulation results comparing the electromagnetic torque frequency spectrum 46 during one electrical cycle using the APWM scheme, and the electromagnetic torque frequency spectrum 48 during the control cycle using the APWM scheme.

From the above comparisons, it is clear that the APWM scheme has virtually no content at the switching frequency, e.g., 10 kHz, as compared to the DPWMMINO scheme. It is important to minimize this content, since it is typically within the audible range. In addition, the APWM scheme retains linear inverter operation at low modulation indices similar to the DPWMMINO scheme, while improving the overall torque ripple. Using the blending operations described herein, the entire duty ratio is utilized and the optimal PWM resolution is maintained.

Embodiments described herein may be utilized in a method of controlling an electric motor. The method is discussed as follows in conjunction with the control system 10, but is not so limited. The method includes one or more stages. In one embodiment, the method includes the execution of all of the stages in the order described. However, certain stages may be omitted, stages may be added, or the order of the stages changed.

In the first stage, a processing device such as the control module 40, the motor control system 10 and/or one or more components or modules thereof (individually or in cooperation) receives a torque command. The torque command, in one embodiment, is supplied by an EPS system or vehicle control system (autonomous semi-autonomous), although the embodiments described herein can be any suitable system that utilizes an electric motor.

In the second stage, the torque command is converted to a current command and input to a current controller that generates modulation parameters. The modulation parameters include a modulation index value, which is input to a duty cycle generator or pulse width modulator. The pulse width modulator generates switching signals that define duty cycles (i.e., duty ratios) for each phase of an electric motor, such as a power steering system or vehicle steering control motor.

In the third stage, the pulse width modulator generates the switching signals according to an adaptive PWM method. For example, switching signals or duty cycle signals are calculated using a function $f_b(M_i)$ that can take the form of a mathematical relationship or set of values. In one embodiment, the switching signals are calculated using a look up table or other data structure that stores values off $f_b(M_i)$ for different modulation index values. When the modulation index is greater than or equal to $a_1$ and less than or equal to $a_2$, the value $f_b(M_i)$ represents a relative proportion or percentage of the calculation that is influenced by a continuous PWM scheme. For example, for modulation index values closer to $a_1$, a higher percentage of the switching signal is based on continuous PWM, and for modulation index values closer to $a_2$, a higher percentage of the switching signal is based on non-continuous PWM.

In the fourth stage, the switching signals are output to a power converter that converts signals from the pulse width modulator to voltage signals that are applied to the motor. In one embodiment, the power converter is an inverter, although any suitable type of converter (e.g., a rectifier) can be used.

In the fifth stage, during operation of the motor, various measurements are performed and sent to control modules or components, such as the current controller and the pulse width modulator. For example, motor position measurement signals and motor current measurement signals are periodically sampled at each control cycle. The current and position measurement signals are input to appropriate processing devices or modules in a motor control system, and the modulation signal is adjusted if needed. The adjusted modulation signal is used to control voltage signals sent to the motor.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A control system for controlling operation of an electric motor, comprising:
   a current command module configured to receive a torque command and output a current command;
   a current controller module configured to generate a modulation index value based on the current command; and
   a signal generator configured to generate a voltage signal modulated via a pulse width modulation (PWM) waveform based on the modulation index value, the PWM waveform being a combination of a continuous PWM waveform and a non-continuous PWM waveform based on the modulation index value being greater than or equal to a first threshold value, the combination being a weighted combination of the continuous PWM waveform and the non-continuous PWM waveform, the weighted combination calculated based on a function of the modulation index value, the signal generator configured to output the voltage signal to the electric motor.

2. The system of claim 1, wherein the voltage signal is generated via the continuous PWM waveform based on the modulation index value being less than the first threshold value.

3. The system of claim 2, wherein the voltage signal is generated via the combination of the continuous PWM waveform and the non-continuous PWM waveform based on the modulation index value being greater than or equal to the first threshold value and less than a second threshold value, the second threshold value greater than the first threshold value.

4. The system of claim 3, wherein the voltage signal is generated via the non-continuous PWM waveform based on the modulation index value being greater than or equal to the second threshold value.

5. The system of claim 1, wherein the continuous PWM waveform is a sinusoidal PWM waveform.

6. The system of claim 1, wherein the non-continuous PWM waveform is one of a discontinuous PWM minimum (DPWMMIN) waveform and a discontinuous PWM minimum with offset (DPWMMINO) waveform.

7. The system of claim 1, wherein the signal generator includes a duty cycle generator configured to generate a duty cycle signal based on the modulation index value and a phase advance value, and a converter module configured to receive the duty cycle signal and output the voltage signal to the motor based on a modulation signal.

8. The system of claim 1, wherein the electric motor is configured to perform at least one of: applying an assist torque to a steering system of a vehicle, and controlling the steering system.

9. A control system for controlling operation of an electric motor, comprising:
a current command module configured to receive a torque command and output a current command;
a current controller module configured to generate a modulation index value based on the current command; and
a signal generator configured to generate a voltage signal modulated via a pulse width modulation (PWM) scheme based on the modulation index value, the PWM scheme being a combination of a continuous PWM scheme and a non-continuous PWM scheme based on the modulation index value being greater than or equal to a first threshold value, the signal generator configured to output the voltage signal to the electric motor, wherein the combination is calculated based on the following relation:

$$V_{APWM} = V_{DPWMMIN} + f_b(M_i)(1 - \max(V_{DPWMMIN})),$$

wherein $V_{APWM}$ is the voltage signal, $V_{DPWMMIN}$ is a voltage value calculated based on the non-continuous PWM scheme, and $\max(V_{DPWMMIN})$ is a maximum value of the voltage, and $f_b(M_i)$ is a function calculate based on a difference between the modulation index value and two threshold values.

10. A method of controlling an electric motor, comprising:
receiving a torque command and outputting a current command by a current command module;
generating a modulation index value based on the current command;
generating a voltage signal by a signal generator, the voltage signal modulated via a pulse width modulation (PWM) waveform based on a modulation index value, the PWM waveform being a combination of a continuous PWM waveform and a non-continuous PWM waveform based on the modulation index value being greater than or equal to a first threshold value, the combination being a weighted combination of the continuous PWM waveform and the non-continuous PWM waveform, the weighted combination calculated based on a function of the modulation index value; and
outputting the voltage signal to the electric motor.

11. The method of claim 10, wherein the voltage signal is generated via the continuous PWM waveform based on the modulation index value being less than the first threshold value.

12. The method of claim 11, wherein the voltage signal is generated via the combination of the continuous PWM waveform and the non-continuous PWM waveform based on the modulation index value being greater than or equal to the first threshold value and less than a second threshold value, the second threshold value greater than the first threshold value.

13. The method of claim 12, wherein the voltage signal is generated via the non-continuous PWM waveform based on the modulation index value being greater than or equal to the second threshold value.

14. The method of claim 10, wherein the continuous PWM waveform is a sinusoidal PWM waveform.

15. The method of claim 10, wherein the non-continuous PWM waveform is one of a discontinuous PWM minimum (DPWMMIN) waveform and a discontinuous PWM minimum with offset (DPWMMINO) waveform.

16. The method of claim 10, wherein outputting the voltage signal includes generating a duty cycle signal based on the modulation index value and a phase advance value, and transmitting the duty cycle signal to a converter module configured to convert the duty cycle signal to the voltage signal.

17. The method of claim 10, wherein the electric motor is configured to perform at least one of: applying an assist torque to a steering system of a vehicle, and controlling the steering system.

18. A method of controlling an electric motor, comprising:
receiving a torque command and outputting a current command by a current command module;
generating a modulation index value based on the current command; and
generating a voltage signal by a signal generator, the voltage signal modulated via a pulse width modulation (PWM) scheme based on a modulation index value, the PWM scheme being a combination of a continuous PWM scheme and a non-continuous PWM scheme based on the modulation index value being greater than or equal to a first threshold value; and outputting the voltage signal to the electric motor, wherein the combination is calculated based on the following relation:

$$V_{APWM} = V_{DPWMMIN} + f_b(M_i)(1 - \max(V_{DPWMMIN})),$$

wherein $V_{APWM}$ is the voltage signal, $V_{DPWMMIN}$ is a voltage value calculated based on the non-continuous PWM scheme, and $\max(V_{DPWMMIN})$ is a maximum value of the voltage, and $f_b(M_i)$ is a function calculate based on a difference between the modulation index value and the two threshold values.

* * * * *